Patented Aug. 30, 1949

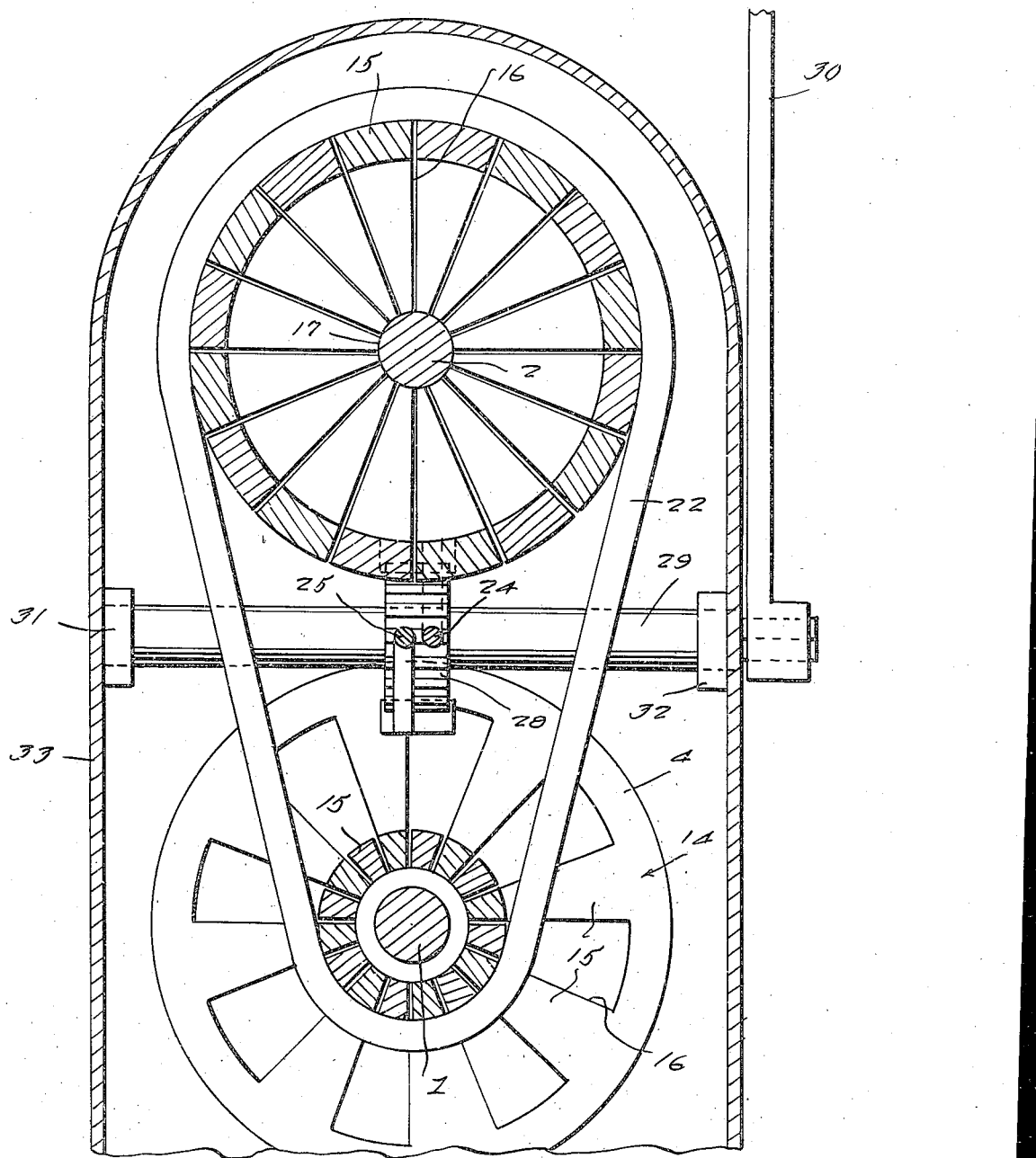

2,480,492

UNITED STATES PATENT OFFICE 2,480,492

VARIABLE SPEED CONTROL MECHANISM

Alexander V. Marsow, Manila, P. I.

Application July 19, 1946, Serial No. 684,649

1 Claim. (Cl. 74—230.17)

This invention relates to a variable speed control mechanism and has particular reference to driving mechanism in which it is desirable to control the speed within narrow limits, and wherein it may also be desirable or necessary to make changes in speed without interrupting the continued motion of the machine.

The chief object of the invention is to provide a variable speed control mechanism through which the ratio between the speed of a driving member and that of a driven member can be adjusted to any of an infinite number of values over a given range.

A further object is the provision of a mechanism of this kind which is simple in construction, capable of fine adjustment and positive in operation.

A still further object of the invention is to provide mechanism of this kind which is capable of being easily maintained in accurate working condition and in which the parts are so designed, constructed and arranged that lost motion between the parts, looseness or wear will not adversely affect the accuracy of the control.

To the accomplishment of the foregoing ends, the invention, briefly stated, comprises a pair of variable diameter pulleys operatively connected by a belt or similar power transmitting means, and control mechanism by which the effective diameters of the pulleys can be simultaneously regulated.

The principle of the invention, and its mode of operation, can best be understood from the following description of the same taken in connection with the accompanying drawings in which:

Figure 2 is a vertical cross section taken centrally of Figure 1.

Figure 1:
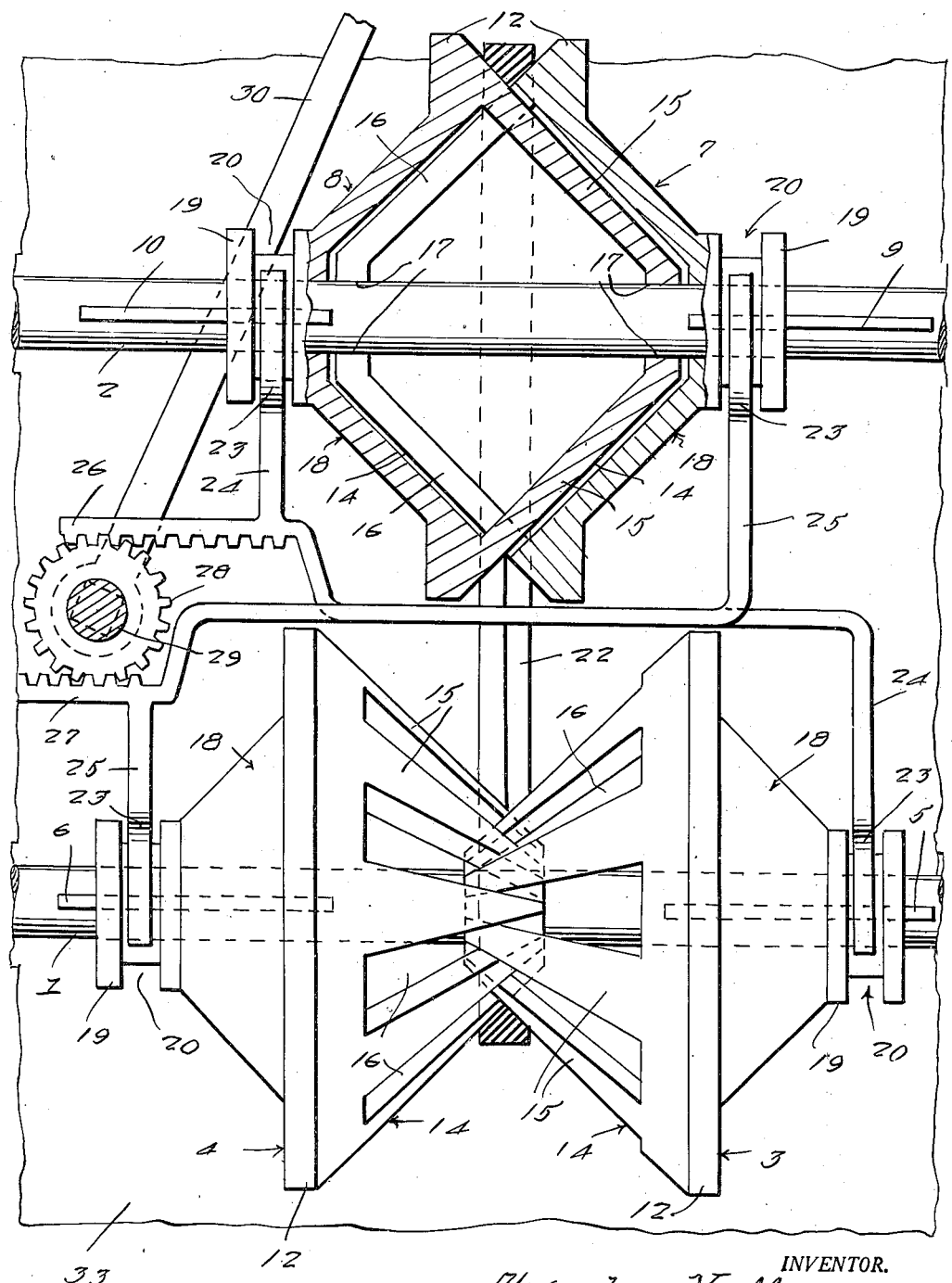
Figure 1 is a side elevational view of the invention partially in section.

As illustrated in the drawings 1 represents a drive shaft operated from any suitable source of power, and 2 is a driven shaft designed to be operatively associated with mechanism which it is desired to operate.

The drive shaft 1 carries a variable pulley comprising identical cone-shaped elements 3 and 4 secured thereon by elongated keys 5 and 6 respectively, so that the cone elements slide freely along the shaft 1 and rotate therewith.

The driven shaft 2 is likewise provided with a variable pulley made up of the identical cone elements 7 and 8 secured thereon by elongated keys 9 and 10 respectively by which means the cone elements are capable of sliding freely along the shaft 2 and rotate the same.

Each of the cone elements 3, 4, 7 and 8 takes the form of a hollow body having cone-shaped ends. Each element is formed with peripheral, thickened wall portion 12 in the vicinity of its greatest diameter, as will best be seen in the cross-section of Figure 1. The inner conical portions 14 of the cone elements are formed with tapered teeth or fingers 15, separated by slots 16 of the same shape and size. Eight such fingers 15 are shown in the drawings on each of the cone elements, but it will of course be understood that any number of fingers can be provided depending upon the size of the mechanism, the material of which it is formed and the purpose for which it is designed. The fingers 15 are of uniform thickness throughout their lengths, but increase gradually in width from point to base. The bases of the fingers join the body of the cone element near the peripheral, thickened wall portion 12, thus forming a structure of increased strength. The fingers 15 are formed at their ends with bearing surfaces 17, as best seen in Figure 1 adapted to slide upon the shafts. The arrangement and proportions of the fingers 15 and slots 16 is such that the fingers of one cone element fit into the slots of the opposite cone element and the fingers of the opposed cones remain intermeshed as the cones are moved toward or away from each other.

The outer conical portions 18 of the cone elements terminate in integrally formed bearing portions or collars 19 having peripheral grooves 20 therein for a purpose later to be made apparent. These bearing collars 19 fit snugly upon the shafts and cooperate with the elongated keys 5, 6, 9 and 10 by which means the rotation of the cone elements in unison with the shafts is assured. The bearing collars 19 and the bearing surfaces 17 formed on the ends of the fingers 15 constitute spaced-apart bearings on each of the cone elements which serve to impart increased rigidity and stability to the same when mounted on the shafts.

A belt 22 or other equivalent power transmitting means passes around the two pulleys. This belt is preferably V-shaped in cross-section, as will be seen in Figure 1, so that the same will fit snugly against the V-shaped grooves formed on the pulleys by the overlapping of the fingers 15 of the opposed cone elements.

It will be apparent from an inspection of Figure 1, and from the above description, that when the opposed cone elements of the variable pulleys approach each other the effective diameters upon which the belt 22 operates will be increased and that when those elements are separated the effective diameters will decrease.

In order to regulate the positions of the cone elements on the shafts, yokes 23 are provided to engage in the grooves 20 of each of the bearing collars 19. A rod 24 connects the yokes which engage the cone elements 3 and 8, and a rod 25 connects the yokes engaging the cone elements 4 and 7. The rods 24 and 25 are formed with rack extensions 26 and 27 respectively which mesh with a gear 28 mounted on a shaft 29 adapted to be rotated by a lever 30. The shaft 29 is supported in bearings 31 and 32 secured to the opposite sides of a housing 33 shaped to cover the entire speed varying mechanism.

The operation of the above described mechanism takes place as follows:

The control lever 30 when moved to the left, in the arrangement as seen in Figure 1, rotates the shaft 29 and therewith the gear 28 in a counterclockwise direction, which causes the rack 26 to move to the left and rack 27 to move to the right. The movement of rack 26 to the left carries with it the yokes attached to rod 24 and moves cone elements 3 and 8 to the left. In a like manner the rack 27 through rod 25 moves cone elements 4 and 7 to the right. This operation results in cone elements 3 and 4 approaching each other simultaneously while at the same time the cone elements 7 and 8 are simultaneously drawn apart. The distance by which the cone elements 3 and 4 approach each other is always the same as the distance by which the cone elements 7 and 8 are simultaneously separated and vice versa. This movement of the cone elements increases the effective diameter of the drive pulley and simultaneously decreases the effective diameter of the driven pulley resulting in an increase in the speed of the driven shaft 2. Movement of the lever 30 to the right operates in a similar manner to bring about the reverse of the result just described.

It will be readily appreciated that any intermediate change in speed can be accomplished by moving the lever 30 to some intermediate position, and that the desired change of speed takes place without interrupting in any way the continuous movement of the power transmission.

From the above description it will be seen that the invention provides a means whereby very close regulation of the speed of any machine to which the same is applied can be had and that the control is accurate and positive in operation.

Furthermore, the design and arrangement of the parts of the mechanism results in an even distribution of any lost motion therein, whether due to wear or inherent in the construction of the mechanism, so that the accuracy of the control is not depreciated thereby.

Having thus clearly shown and described the invention, what is claimed and desired to secure by Letters Patent is:

In a speed change mechanism, including a pair of parallel shafts, a pair of variable diameter pulleys each comprising a pair of opposed cones, there being a pulley on each shaft, each cone of each pair being movable axially on a shaft toward and away from its companion cone, the improvement comprising a cross-shaft between said first shafts and extending at right angles thereto on a parallel plane, a pinion fixed to said cross-shaft, a pair of spaced and opposed racks in mesh with opposite sides of said pinion, said racks being parallel to said first shafts, yokes carried by said racks operatively connecting each rack to a cone of one pulley and to an opposed cone of the other pulley, whereby to move the cones of each pulley in opposite directions simultaneously as said cross-shaft is rotated, and means for rotating said cross-shaft.

ALEXANDER V. MARSOW.

REFERENCES CITED

The following references are of record in the file of this patent:

UNITED STATES PATENTS

| Number | Name | Date |
| --- | --- | --- |
| Re. 18,096 | Dehuff | June 9, 1931 |
| 534,448 | McIntyre | Feb. 19, 1895 |
| 562,234 | McIntyre | June 16, 1896 |
| 710,714 | Reeves | Oct. 7, 1902 |
| 2,074,997 | Faltermayer | Mar. 23, 1937 |

FOREIGN PATENTS

| Number | Country | Date |
| --- | --- | --- |
| 18,348 | Great Britain | Aug. 9, 1909 |